United States Patent [19]

Lee

[11] Patent Number: 5,793,417
[45] Date of Patent: Aug. 11, 1998

[54] APPARATUS AND METHOD OF CONTROLLING DRIVING SELECTION OF NTSC REJECTION FILTER

[75] Inventor: Myeong-Hwan Lee, Kyungki-do, Rep. of Korea

[73] Assignee: Samsung Electronics Co., Ltd., Kyungki-Do, Rep. of Korea

[21] Appl. No.: 738,808

[22] Filed: Oct. 28, 1996

[30] Foreign Application Priority Data

Oct. 31, 1995 [KR] Rep. of Korea ............... 38752/1995

[51] Int. Cl.$^6$ ..................................... H04N 5/38
[52] U.S. Cl. ..................... 348/21; 348/470; 348/725
[58] Field of Search ................... 348/21, 470, 607, 348/614, 611, 725; 375/345, 346, 261

[56] References Cited

U.S. PATENT DOCUMENTS

| | | | |
|---|---|---|---|
| 5,506,676 | 4/1996 | Patel et al. | 348/725 |
| 5,546,132 | 8/1996 | Kim et al. | 348/607 |
| 5,592,235 | 1/1997 | Park et al. | 348/555 |
| 5,602,602 | 2/1997 | Hulyalkar | 348/607 |
| 5,659,372 | 8/1997 | Patel et al. | 348/731 |

Primary Examiner—Victor R. Kostak
Attorney, Agent, or Firm—Sughrue, Mion, Zinn, Macpeak & Seas, PLLC

[57] ABSTRACT

When both an NTSC signal and an ATV signal are concurrently broadcast in a co-channel, it is desirable to remove the NTSC signal at the receiver when reproducing the broadcast ATV signal, since the NTSC signal would interfere with the ATV signal. An NTSC rejection filter is used to remove most of the signal power of an NTSC broadcast signal. To more effectively handle multipath interference signals, the present invention adaptively controls the driving selection of an NTSC rejection filter. The mean power levels are calculated for an input signal which has not been NTSC rejection filtered and for a second input signal which has been NTSC rejection filtered. Error differences are then calculated for each of these mean power levels and a driving selection is determined for the NTSC rejection filter based upon the calculated error differences. The present invention includes a driving selection determination circuit which compares the error difference signals over a predetermined period of time to produce a selection signal.

10 Claims, 7 Drawing Sheets

APPARATUS AND METHOD OF CONTROLLING DRIVING SELECTION OF NTSC REJECTION FILTER

BACKGROUND OF THE INVENTION

1. Field of the Invention

The present invention relates to a receiving system related to an advanced TV (ATV) or a high definition TV (HDTV), and more particularly to an apparatus and method for controlling driving selection of an NTSC rejection filter (hereinafter, referred to as an NRF) to efficiently preventing the deterioration of an ATV broadcasting by NTSC signals when the ATV and the NTSC are concurrently broadcasting through a co-channel. The present application is based upon Korean Application No. 38752/1995, which is incorporated herein by reference.

2. Description of the Related Art

Recently, a grand alliance vestigial sideband (GA-VSB) system has been adopted as a transceiving system of the ATV which is for a next generation TV system. In this system, a concurrent broadcasting with the conventional NTSC system is under consideration. However, in such a case, an additional process utilizing the NRF must be provided to reduce the probable interference of a NTSC signal component with the ATV. The function of the NRF is to efficiently prevent the deterioration of the ATV broadcasting due to the interference of the NTSC signal component in a co-channel status in which the ATV and the NTSC are concurrently broadcast. The basic concept of the NRF is to remove the carrier components of the NTSC signals. The NRF driving has merit in that the effect of the NTSC interference can be minimized. However, since the noise performance (signal-to-noise ratio) of the ATV system is reduced by 3dB, a determination to drive the NRF by searching the presence and strength of the interference of the NTSC signal component is required.

Prior to the description of the necessity of NRF driving determination, the need for an NRF application in the GA-VSB system will be described to establish the clear understanding of the technical background. Then, a conventional determination method suggested for the NRF driving and its defects will be described.

Referring to FIGS. 1A–1D showing the result of a GA-VSB simulation, the characteristic of the NTSC interference and the NRF result will be described. FIG. 1A shows an NTSC signal and FIG. 1B shows a modulated NTSC signal. FIG. 1C shows the frequency spectrum of the modulated NTSC signal. FIG. 1D shows the resulting frequency spectrum of the NTSC signal after passing through the NRF.

The NTSC signal in the co-broadcasting of the NTSC and ATV has a particular carrier frequency offset (about 0.89MHz) with respect to the VSB signal. Thus, considering the VSB signal from the viewpoint of a baseband area, the NTSC signal appears to be modulated into a frequency as much as the frequency offset with respect to the VSB signal. That is, frequency-modulating of the color bar signal as shown in FIG. 1A results in that in FIG. 1B. An NTSC signal so modulated comes to have the frequency characteristic as shown in FIG. 1C and it can be seen that nearly the entire energy (modulated carrier component) is concentrated on the frequency band close to the particular frequency offset in view of the baseband of the VSB signal. Thus, the mere removing of the energy in the frequency band close to the offset frequency considerably reduces the interference of the NTSC signal component. That is, when the interfering NTSC signal component passes through the NRF, the modulated carrier component is removed as shown in FIG. 1D (an energy value of 430 drops to 45 after passing through the NRF) so that the affect of the NTSC signal with respect to the ATV signal is reduced.

Next, the conventional NRF driving selection determination method suggested in the GA-VSB system will be described. The NRF driving selection determination method is disclosed in "Grand Alliance HDTV System Specification" submitted to the ACATS Technical Subgroup, February 1994. The method utilizes a reference signal (field sync signal) and the structure thereof is shown in FIG. 2.

In FIG. 2, a reference numeral 2 denotes an NTSC interference detector and a reference numeral 4 denotes an equalizer. The NTSC interference detector 2 is connected to a frequency & phase locked loop (FPLL) and the equalizer 4 is connected to a phase tracker loop (PTL). The NTSC interference detector 2 comprises a matched filter 10, first and second NRFs 12 and 16, first and second adders 18 and 24, first and second squaring circuits 20 and 26, first and second accumulators 22 and 28, an error power detector 30 and a multiplexer 14. To sum up the operation of the NTSC interference detector 2, a reference signal value stored in a receiver is subtracted from a received input signal value and the subtracted value is squared before being accumulated. The accumulated value (an error value) is used for the determination of the NRF driving.

In FIG. 2, a signal B' output from the matched filter 10 is input to an input terminal 0 of the multiplexer 14. A signal A' which results from NTSC-reject-filtering the signal B' by the first NRF 12 is input to an input terminal 1 of the multiplexer 14. A first path constituted by the first adder 18, the first squaring circuit 20 and the first accumulator 22 is the non-NRFed path and a second path constituted by the second adder 24, the second squaring circuit 26 and the second accumulator 28 is the path where the reference signal REF is NRFed.

In the first (non-NRFed) path, difference between the input signal B' and the REF is output via the first adder 18 and the above output passes the first squaring circuit 20 and the first accumulator 22 to be squared and accumulated. Since the REF is a field sync signal, the output of the first adder 18 becomes an error value. Little difference between the input signal B' and the REF means that there is few errors, and otherwise, that there are many errors. Thus, the output value B of the first accumulator 22 becomes an error power value.

In the second path, the difference between the signal A' which results from NRFing of the input signal B' by the first NRF 12 and a reference signal REF' which results from NRFing of the REF by the second NRF 16 is output via the second adder 24. This output signal passes the second squaring circuit 26 and the second accumulator 28 to be squared and accumulated. Since the REF' is a field sync signal, the output of the second adder 24 becomes an NRFed error value. Little difference between the input signal A' and the REF' means that there is few NRFed errors, and otherwise, that there are many NRFed errors. Thus, the output value A of the second accumulator 28 becomes an error power value.

When the error power values A and B are applied to the error power detector 30, the error power detector 30 detects a degree of interference of the NTSC signal component on a channel by comparing the error power values B and A. As the NTSC signal component increases, the error power value B denotes a larger value than A since the value A is the NRFed error power value.

The error power detector 30 controls the multiplexer 14 in selecting a signal of a path corresponding to the lower value by comparing the different error power values B and A. That is, when A>B, the error power detector 30 outputs "0" to a selection terminal S of the multiplexer 14 and the multiplexer 14 in response thereto selects and outputs the signal B' applied to the input terminal 0. When the signal B' is selected, the equalizer 4 acts as an 8-level equalizer.

When A<B, the error power detector 30 outputs "1" to the selection terminal S of the multiplexer 14 and the multiplexer 14 in response thereto selects and outputs the signal A' applied to the input terminal 1. The output of the error power detector 30 is applied to the equalizer 4. When the multiplexer 14 selects the signal A', the equalizer 4 acts as a 15-level equalizer in response to the output of the error power detector 30. In the contrast (as noted above), when the multiplexer 14 selects the signal B', the equalizer 4 acts as an 8-level equalizer in response to the output of the error power detector 30.

The level equalizer 4 acting as a 15-level equalizer has the advantage of removing the interfered NTSC signal component and the disadvantage of reducing noise performance (3dB). However, the level equalizer 4 acting as an 8-level equalizer has the complementary advantages and disadvantages contrary to the 15-level equalizer. A reference numeral 6 in FIG. 2 denotes a symbol timing restoring and field sync signal detector for applying a field sync signal to the equalizer 4.

However, the above-described NRF driving selection determination method has the following problems. In the conventional determination method suggested in the GA-VSB system, the interfered NTSC signal component is well detected to select the 15-level equalizer of the NRF driving when there is no multipath component in a signal. However, when there is the multipath component in a signal, the 8-level equalizer tends to be selected although there exists the interfering NTSC signal component. This is because the error power value A applied to the error power detector 30 becomes larger than the B since the multipath component acts as noise in the signal. Thus, the interfered NTSC signal component is not NRFed. That is, the conventional determination method suggested in the GA-VSB system has a problem of malfunctioning in the presence of the multipath interference.

SUMMARY OF THE INVENTION

To overcome the above problem, it is an object of the present invention to provide an apparatus and method for controlling the driving selection of the NRF to efficiently prevent the deterioration of the ATV broadcasting caused by NTSC signals in the co-channel where the ATV and NTSC are concurrently broadcasted.

It is another object of the present invention to provide an apparatus and method for preventing NRF driving malfunction in the presence of a multipath component in an input signal.

It is still another object of the present invention to provide an apparatus and method for efficiently driving the NRF through detecting the presence and degree of the interfering NTSC signal component.

To achieve the above objects of the present invention, there is provided an apparatus for controlling driving selection of an NTSC rejection filter which includes an NTSC rejection filter for rejection-filtering an NTSC signal component of a first input signal and to output the filtered signal as a second input signal. The apparatus also includes first and second mean power level calculators for calculating the mean power level of the first and the second input signal of a field sync signal section and a first mean power difference calculator for calculating the difference between a mean power level of the first input signal and a first reference power level of the field sync signal section in a preset 8-level input signal state, as well as a second mean power difference calculator for calculating the difference between a mean power level of the second input signal and a second reference mean power level of the field sync signal section in a preset 15-level input signal state. A driving selection determiner is also included for comparing the first and the second mean power differences to output a selection determination signal, as well as and a selector for selecting the first or second input signal in response to the selection determination signal and outputting the selected one to an equalizer.

BRIEF DESCRIPTION OF THE DRAWINGS

These and various other features and advantages of the present invention will be readily understood with reference to the following detailed description taken in conjunction with the accompanying drawings, in which.

DETAILED DESCRIPTION OF THE PREFERRED EMBODIMENT

A preferred embodiment of the present invention will be fully discussed with reference to the accompanying drawings.

Figure 1A:
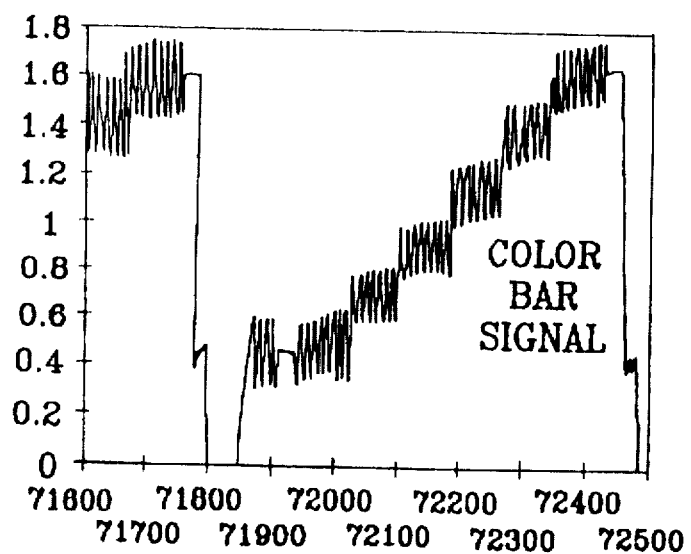
FIG. 1A is a graph indicating NTSC signals in a GA-VSB simulation.
Figure 1B:
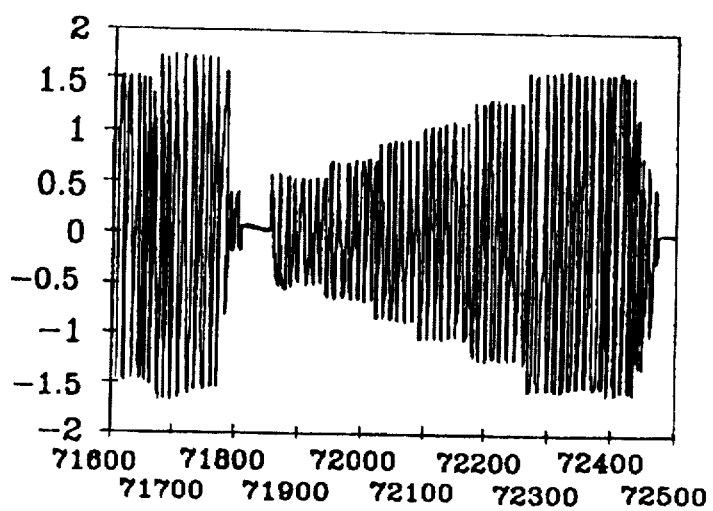
FIG. 1B is a graph indicating modulated NTSC signals.
Figure 1C:
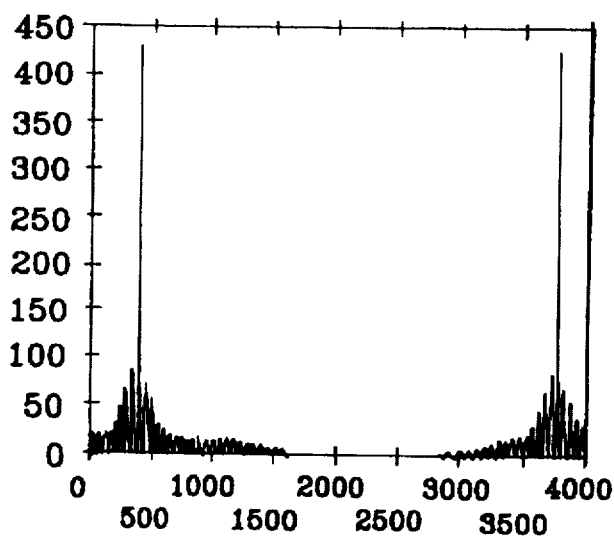
FIG. 1C is a graph indicating the frequency spectrum of the modulated NTSC signals.
Figure 1D:
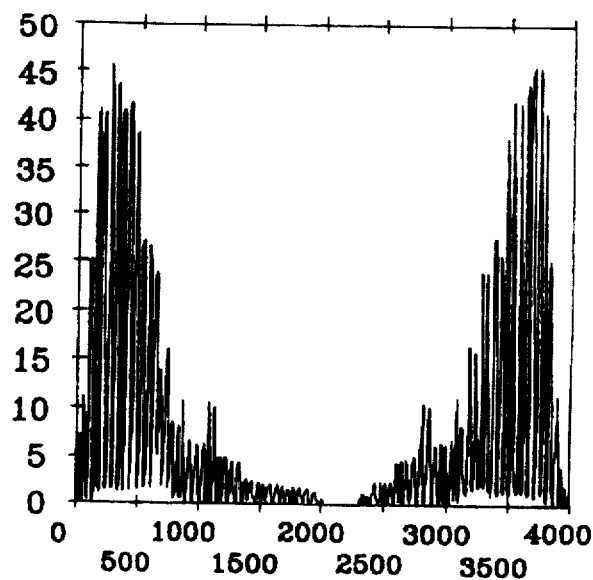
FIG. 1D is a graph indicating the frequency spectrum of the NRF result of the filtered NTSC signals.
Figure 2:
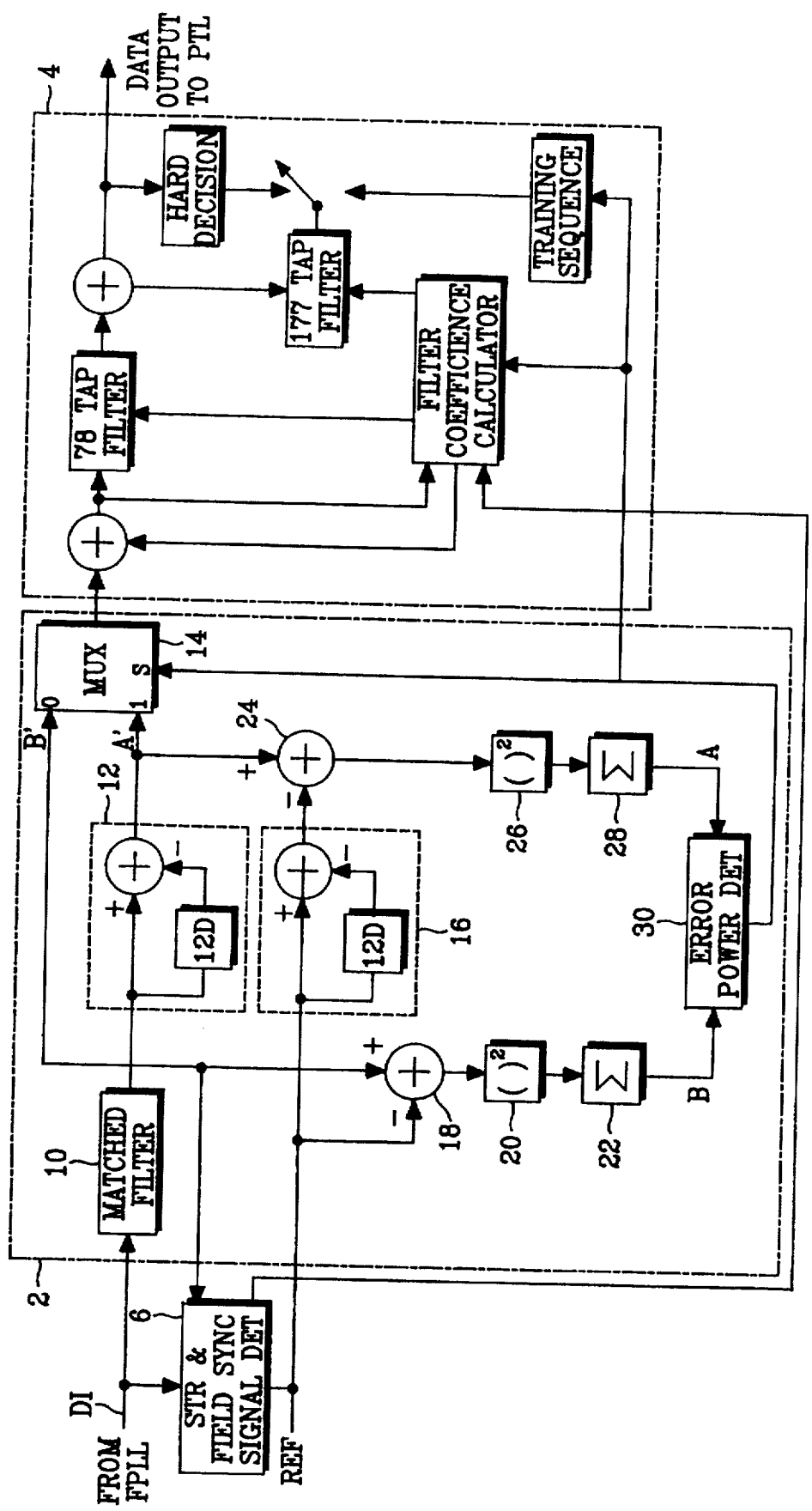
FIG. 2 is a block diagram illustrating a conventional NTSC interference detector and an equalizer in the GA-VSB system.
Figure 3:
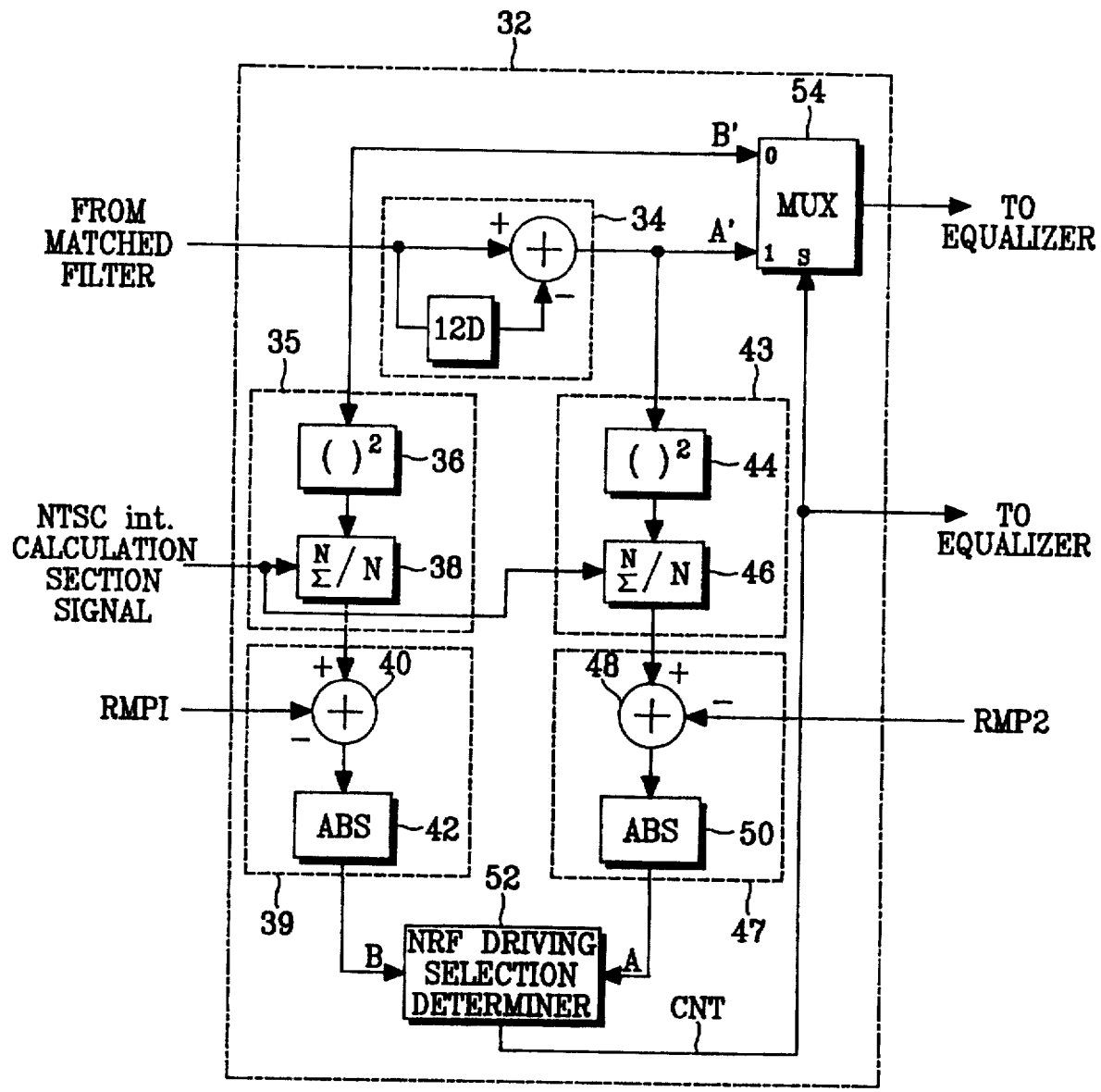
FIG. 3 is a block diagram illustrating an NTSC interference detector according to the present invention.

FIG. 3 shows the structure of an NTSC interference detector 32 according to the present invention. An NRF 34 is connected to the matched filter (10 of FIG. 2) for rejection-filtering an NTSC signal component in a first input signal including the NTSC signal component and a multipath component to output as a second input signal. A first mean power level calculator 35 is constituted by a first squaring circuit 36 and a first accumulating & averaging circuit 38. It calculates the mean power level of the first input signal output from the matched filter 10 during a field sync signal section or a field section in response to an NTSC interference calculation section signal. A first mean power difference calculator 39, constituted by a first adder 40 and a first absolute value portion 42, calculates the difference between a first reference mean power level of a field sync signal section or a field section and a mean power level of the first input signal output from the first mean power level calculator 35 during a preset 15-/8-level input signal state.

A second mean power level calculator 43, constituted by a second squaring circuit 44 and a second accumulating & averaging circuit 46, calculates the mean power level of the second input signal output from the NRF 34 during a field sync signal section or a field section in response to the NTSC interference calculation section signal. A second mean power difference calculator 47, constituted by a second adder 48 and a second absolute value portion 50, calculates the difference between a second reference mean power level of a field sync signal section or a filed section and a mean power level of the second input signal during a preset 15-/8-level input signal state.

A driving selection determination portion 52 outputs a selection determination signal by comparing the first mean power difference calculated at the first mean power difference calculator 39 and the second mean power difference calculated at the second mean power difference calculator 47. A multiplexer 54 selects the first input signal output from the matched filter 10 or the second input signal, which is the first input signal passed through the NRF 34, based upon the selection determination signal applied from the driving selection determination portion 52. The multiplexer 54 outputs the selected signal to the equalizer 4.

In detecting the interfered NTSC signal component, the determination method of the present invention is divided into a method using the field sync signal as a reference signal and another method using just random data as a reference signal. In summary, the method includes an additional determination for controlling the NRF driving selection to increase discrimination under the circumstances of multipath interference.

Referring to FIG. 3, the signal B' output from the matched filter 10 is input to the input terminal 0 of the multiplexer 54 and the signal A' which is the signal B' NRFed by the NRF 34 is input to the input terminal 1 of the multiplexer 54. Thus, it is preferable that the multiplexer 54 selects the input signal B' input to the input terminal 0 when a noise component such as the NTSC signal component is not present in the input signal, and otherwise, selects the signal A' input to the input terminal 1. When the multiplexer 54 selects the signal B', the equalizer 4 acts as an 8-level equalizer based upon control signal CNT applied from the NRF driving selection determination portion 52. When the multiplexer 54 selects the A', the equalizer 4 acts as an 15-level equalizer based upon control signal CNT applied from the NRF driving selection determination portion 52.

Figure 6A:
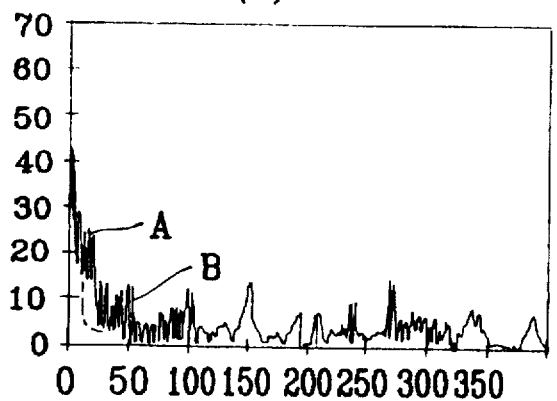
FIGS. 6A and 6B are graphs indicating the equalizing performance of 8-level and 15-level equalizers with respect to a multipath component among input signals.
Figure 6B:
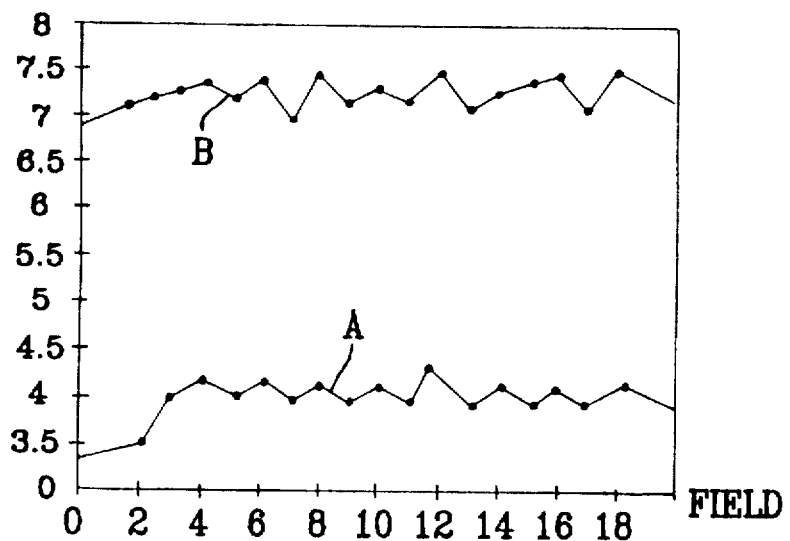

It is apparent from FIGS. 6A and 6B that the equalizer 4 shows a superior equalizing function with respect to a common multipath component and strong NTSC interference when acting as a 15-level equalizer. FIG. 6A shows a symbol error rate A which indicates that the 15-level equalizer has a lower symbol error rate than that of the 8-level equalizer, shown as B. FIG. 6B shows that a value A obtained by an NRF process of an error power value of each field obtained for NRF driving selection is less than a value B which is obtained by a conventional method. Consequently, the 15-level equalizer is selected.

In FIG. 3, the first path constituted by the first mean power level calculator 35 and the first mean power difference calculator 47 is for calculating a mean power difference signal when the input signal is not NRFed. The second path constituted by the second mean power level calculator 43 and the second mean power difference calculator 47 is for calculating a mean power difference signal when the input signal is NRFed.

On the first path, the first mean power level calculator 35 calculates the mean power level of the input signal B' by performing multiplication at the first squaring circuit 36 and accumulative averaging at the first accumulating & averaging circuit 38. At this point, the NTSC interference calculation section signal is applied to the first accumulating & averaging circuit 38, and the signal is a reference signal for controlling the accumulative averaging of signals input during the field sync signal section or a field section. From the first mean power level, calculated as the output of the first mean power level calculator 35, a first reference mean power level RMP1 is subtracted at the first adder 40 of the first mean power difference calculator 39 and then made to be absolute at the first absolute value circuit 42.

The value of the first reference mean power level RMP1 varies according to whether the NTSC interference calculation section signal applied to the first accumulating & averaging circuit 38 is a signal corresponding to the field sync signal section or the signal during the field section. If the NTSC interference calculation section signal is a signal corresponding to the field sync signal section, the value of the first reference mean power level RMP1 becomes "25" because sample values of +5 and −5 only exist for the field sync signal section (when the input signal level is the 8-level). Thus, the mean of value is obtained as follows:

$$\frac{(+5)^2 + (-5)^2}{2} = 25$$

If the NTSC interference calculation section signal is a signal corresponding to the arbitrary field signal section, the value of the first reference mean power level RMP1 becomes "21" because sample values of −7, −5, −3, −1, +1, +3, +5 and +7 exist for the arbitrary field section (when the input signal level is the 8-level). Thus, the mean value is obtained as follows:

$$\frac{(-7)^2 + (-5)^2 + (-3)^2 + (-1)^2 + (+1)^2 + (+3)^2 + (+5)^2 + (+7)^2}{8} = 21$$

Thus, the first mean power difference signal B calculated at the first mean power difference calculator 39 is applied to the NRF driving selection determination portion 52.

In the meantime, since the second mean power level calculator 43 on the second path calculates the mean power level of the input signal A' by performing multiplication at the second squaring circuit 44 and accumulative averaging at the second accumulating & averaging circuit 46. From the second mean power level, calculated as the output of the second mean power level calculator 43, a second reference mean power level RMP2 is subtracted at the second adder 48 of the second mean power difference calculator 47 and then made to be absolute at the second absolute value circuit 50.

The value of the second reference mean power level RMP2 varies according to whether the NTSC interference calculation section signal applied to the second accumulating & averaging circuit 43 is a signal corresponding to the field sync signal section or the signal during the arbitrary field section. If the NTSC interference calculation section signal is a signal corresponding to the field sync signal section, the value of the second reference mean power level RMP2 becomes "50", i.e. double of the 8-level because sample values of +10, 0 and −10 only exist owing to the NRF for the field sync signal section (when the input signal level is the 15-level).

If the NTSC interference calculation section signal is a signal corresponding to the arbitrary field signal section, the value of the second reference mean power level RMP2 becomes "42" because sample values of −14,−12, −10, −8, −6, −4, −2, 0, +2, +4, +6, +8, +10, +12 and +14 exist for the arbitrary field section (when the input signal level is the 15-level). Thus, the second mean power difference signal A calculated at the second mean power difference calculator 47 is applied to the NRF driving selection determination portion 52. Such values vary according to the change of the set level reference values, e.g., 5, −5, etc.

The NRF driving selection determination portion 52 outputs a control signal CNT "0" at the initial stage so that the multiplexer 54 selects the first input signal B' which does not pass through the NRF 34. Also, during operation, the NRF driving selection determination portion 52 compares the first and second mean power differences calculated at the first and second mean power difference calculators 39 and 47 and applies the CNT signal to the selection terminal of the multiplexer 54 if a state continues where the compared difference continues as much as n units. Since the CNT applied to not only the multiplexer 54 but also equalizer 4, it is used for determining the operation of the equalizer 4 as an 8-level equalizer or a 15-level equalizer.

The structure of the NRF driving selection determination portion 52 can be realized by software using a DSP or by hardware of logic circuit structure.

Figure 4:
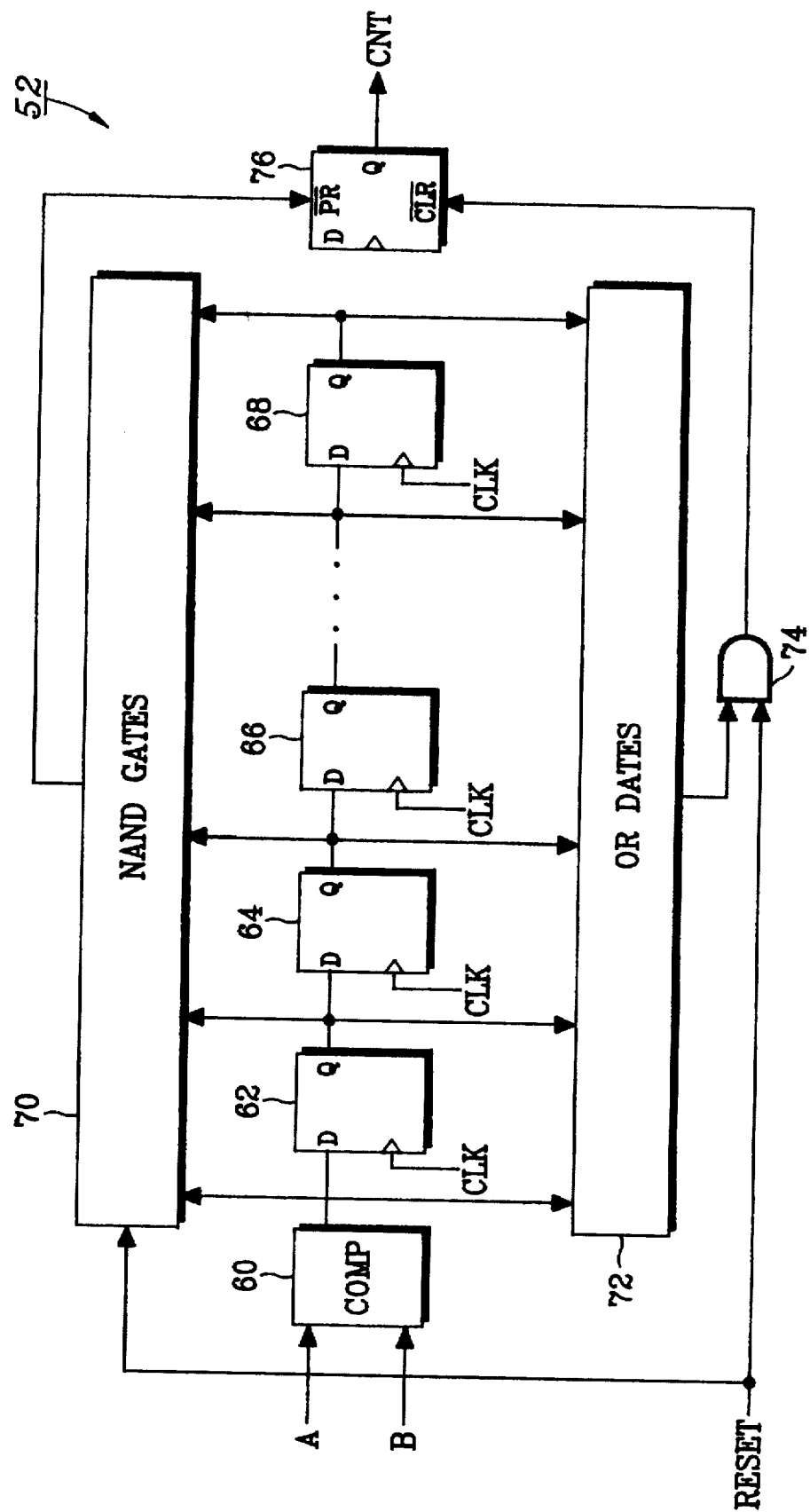
FIG. 4 is a circuit diagram illustrating an NRF driving selection determiner of FIG. 3.

FIG. 4 shows the structure of the NRF driving selection determination portion 52 embodied by hardware using logic circuit structure. The NRF driving selection determination portion 52 comprises a comparator 60, n units of D-type flip-flops 60, 62, 64, 66 and 68 connected in serial with the comparator 60, a NAND gate 70 for NAND-gating the output of comparator 60, the RESET signal, and each output signal of the n units of D-type flip-flops 62, 64, 66 and 68, an OR gate 72 for OR-gating respective output signals output from the comparator 60 and output from the n units of D-type flip-flops 62, 64, 66 and 68, an AND gate 74 for AND gating the output of the OR gate 72 and the RESET signal, and D-type flip-flop 76 where the output line of the NAND gate 70 is connected to a preset terminal $\overline{PR}$ and that of the AND gate 74 is connected to a clear terminal $\overline{CLR}$.

The operation of the NRF driving selection determination portion 52 having such a structure will be now described. The operation thereof can be summed up as to compare the first and second mean power differences B and A and make the output of the compared values into the control signal CNT only when the n units of the compared values are all "0" or "1".

The comparator 60 compares the first and second mean power differences B and A and outputs "0" when A≧B and "1" when A<B. The serially connected n units of D-type flip-flops 62, 64, 66 and 68 continuously shift the output signal of the comparator 60 in response to the clock signal CLK continuously applied only during the NTSC interference calculation section signal. The NAND gate 70 outputs "0" only when the reset signal, the output of the n units of D-type flip-flops 62, 64, 66 and 68, and the output of comparator 60 are all "1". The output of the NAND gate 70 is applied to the preset terminal $\overline{PR}$ of the D-type flip-flop 76. The OR gate 72 outputs p0II only when the output of comparator 60 and the n units of D-type flip-flops 62, 64, 66 and 68 are all "0". The AND gate 74 AND-gates the reset signal and the output of the OR gate 72 and applies the result to the clear terminal $\overline{CLR}$ of the D-type flip-flop 76. Thus, when the D-type flip-flop 76 is preset when the output of the NAND gate 70 is applied to it as "0" the flip-flop 76 outputs a control signal CNT=1. Flip-flop 76 is cleared when the output of the AND gate 74 is applied to it as "0" and then outputs CNT=0 as an output control signal.

The reset signal applied to the NAND gate 70 and the AND gate 74 is used to initialize the NRF driving selection determination portion 52, and at this time, the reset signal is applied to as "0" and the control signal CNT becomes "0".

Figure 5:
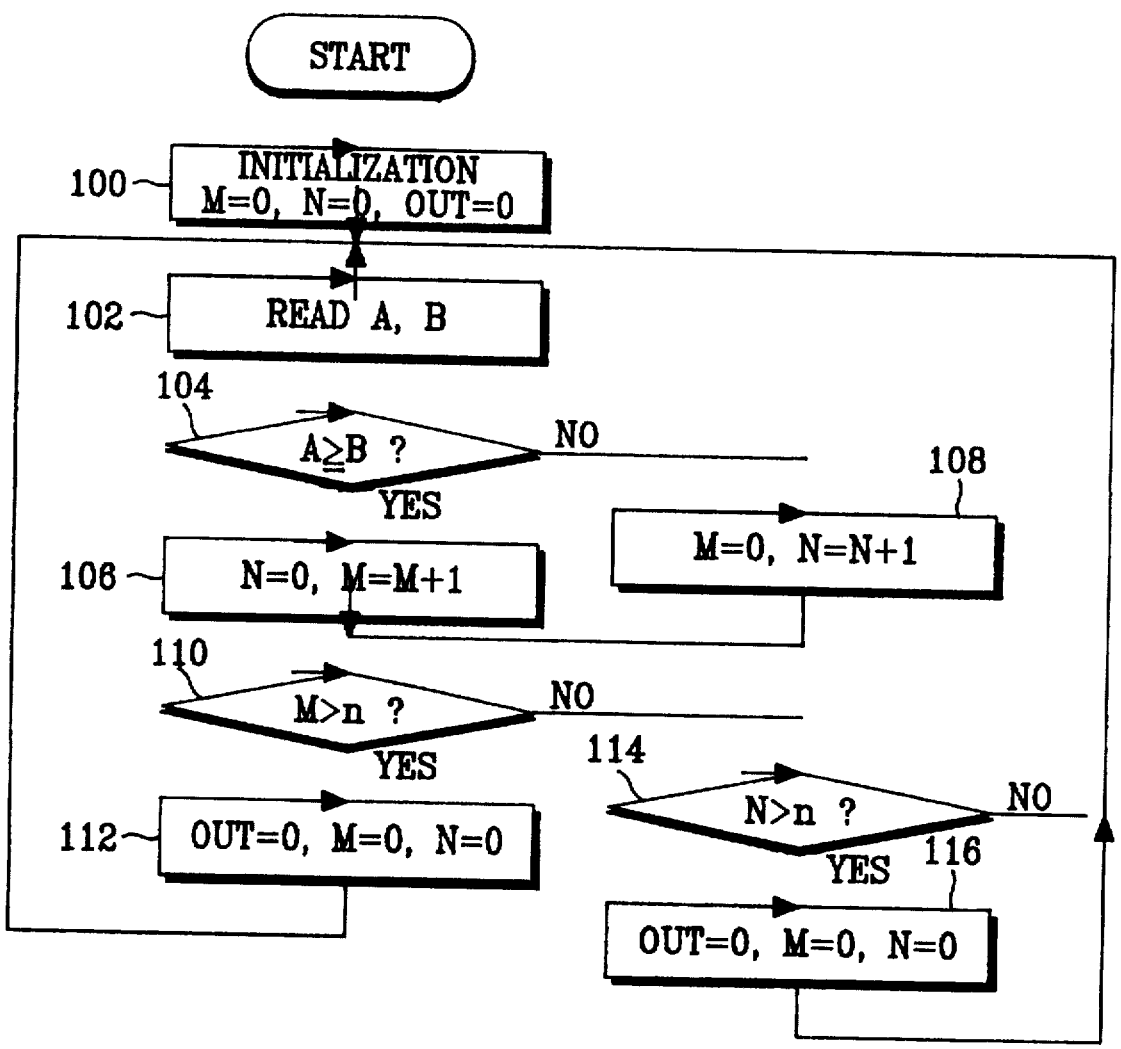
FIG. 5 is a flowchart for explaining implementation of NRF driving selection control using a DSP.

FIG. 5 is a flowchart for explaining the implementation of the NRF driving selection control as an algorithm using DSP. The operation of steps 100–116 in FIG. 5 can be summed up as searching the same selection of continuous n units using two variables M and N and outputting the result as a control signal "out".

The control signal CNT output from the structure of FIGS. 4 and 5 is applied to the selection terminal S of the multiplexer 54 of FIG. 3.

Returning to FIG. 3, the multiplexer 54 selects and outputs the first input signal B' applied to the input terminal 0 when the CNT applied from the NRF driving selection determination portion 52 is "0". When the first input signal B' is selected, the equalizer 4 (of FIG. 2) acts as an 8-level equalizer. Also, the multiplexer 54 selects and outputs the signal A' applied to the input terminal 1 when the CNT applied from the NRF driving selection determination portion 52 is "1". When the second input signal A' is selected, the equalizer 4 acts as a 15-level equalizer.

According to the structure of the NRF driving selection determination portion 52 as shown in FIGS. 4 and 5, the multiplexer 54 of FIG. 2 is continuously adjusted. However, since it cannot be said that the effect of the co-channel NTSC at a fixed receiving position varies greatly with passing time, it is sufficiently considered that, in the structure of the present invention, channel condition is recognized only at the initial stage to select the input to the equalizer 4.

It is noted, through simulation comparing to the present invention with conventional determination methods, that the method according to the present invention reveals better result than the conventional determination method of the GA-VSB system in the operation available area of the equalizer. This results from removing in the present invention the malfunction of the GA-VSB system method under the circumstances of multipath interference. Also, according to the comparison of level selection, less errors are found in the signal power method according to the present invention than in the conventional selection method in the GA-VSB.

Therefore, it should be understood that the present invention is not limited to the particular embodiment described herein as the best mode contemplated for carrying out the present invention. Rather it will be appreciated that many modifications may be made to the present invention is not limited to the specific embodiments described in this specification without departing from the spirit and scope of the present invention.

What is claimed is:

1. An apparatus for controlling driving selection of an NTSC rejection filter comprising:

an NTSC rejection filter for rejection-filtering an NTSC signal component of a first input signal including an NTSC signal component and a multipath component to output the filtered signal as a second input signal;

a first mean power level calculator for calculating the mean power level of the first input signal, for a field sync signal section, in response to a predetermined calculation section signal;

a second mean power level calculator for calculating the mean power level of the second input signal, for said field sync signal section, in response to said predetermined calculation section signal;

a first mean power difference calculator for calculating the difference between said mean power level of the first input signal and a first reference mean power level, for said field sync signal section, in a preset 8-level input signal state;

a second mean power difference calculator for calculating the difference between said mean power level of the second input signal and a second reference mean power level, for the field sync signal section, in a preset 15-level input signal state;

a driving selection determiner for comparing the first and second mean power differences for a predetermined period to output a selection determination signal; and a selector for selecting either said first or second input signal in response to said selection determination signal and outputting the selected input signal to an equalizer.

2. The apparatus as claimed in claim 1, wherein said first reference mean power level in said preset 8-level input signal state is 25, relative to the levels of said preset 8-level input signal state.

3. The apparatus as claimed in claim 1, wherein said second reference mean power level in said preset 15-level input signal state is 50, relative to the levels of said preset 15-level input signal state.

4. An apparatus for controlling driving selection of an NTSC rejection filter comprising:

an NTSC rejection filter which rejection-filters out an NTSC signal component of a first input signal to produce as a filtered output signal a second input signal, said input signal including an NTSC signal component and a multipath component;

a first mean power level calculator which receives the first input signal as an input and which produces as an output the mean power level of the first input signal, for an arbitrary field section, in response to a predetermined calculation section signal;

a second mean power level calculator which receives the second input signal as an input and which produces as an output the mean power level of the second input signal, for said arbitrary field section, in response to said predetermined calculation section signal;

a first mean power difference calculator which receives as inputs said mean power of the first input signal and a first reference mean power level, for the arbitrary field section, said first mean power difference calculator producing as an output a first mean power difference which is the difference between said mean power level of the first input signal and said first reference mean power level, in a preset 8-level input signal state;

a second mean power difference calculator which receives as inputs said mean power of the second input signal and a second reference mean power level, for the arbitrary field section, said second mean power difference calculator producing as an output a second mean power difference which is the difference between said mean power level of the second input signal and said second reference mean power level, in a preset 15-level input signal state;

a driving selection determiner which compares the first and second mean power differences over a predetermined period to output a selection determination signal; and a selector which receives as inputs said first and second input signals, and which produces as a selected output one said first or second input signal selected in response to said selection determination signal, said selected output being input to an equalizer.

5. The apparatus as claimed in claim 4, wherein said first reference mean power level of the arbitrary field section in said preset 8-level input signal state is 21, relative to the levels of said preset 8-level input signal state.

6. The apparatus as claimed in claim 4, wherein said second reference mean power level of the arbitrary field section in said preset 15-level input signal state is 21, relative to the levels of said preset 15-level input signal state.

7. An apparatus for generating a control signal for selecting a first input signal which is not NTSC-rejection-filtered and a second input signal which is rejection-filtered by an NTSC rejection filter, said control signal for controlling driving selection of the NTSC rejection-filter, said apparatus comprising:

a comparing circuit for comparing error values of said first input signal and said second input signal to output a comparison signal;

a delay circuit comprised of a plurality of sequential time delay elements each having respective outputs, said delay circuit delaying the comparison signal by shifting the comparison signal through the sequential time delay elements in response to a predetermined clock signal; and a control signal generator for outputting a control signal of a first logic state when the respective outputs of each of the delay elements of said delay circuit are all at said first logic state, and a control signal of a second logic state when the respective outputs of each of the delay elements of said delay circuit are all at said second logic state.

8. The apparatus as claimed in claim 7, wherein said control signal generator comprises:

a first gate for outputting a first active signal when said outputs of said delay elements are all at said first logic state;

a second gate for outputting a second active signal when said outputs of said delay elements are all at said second logic state; and a latch for outputting said control signal of the first logic state in response to application of said first active signal, and for outputting said control signal of the second logic state in response to application of said second active signal.

9. A method for controlling driving selection of an NTSC rejection filter comprising the steps of:

rejection-filtering an NTSC signal component of a first input signal including an NTSC signal component and a multipath component and outputting the filtered signal as a second input signal;

calculating the mean power level of the first input signal, for a field sync signal section, in response to a predetermined calculation section signal;

calculating the mean power level of the second input signal, for a field sync signal section, in response to a predetermined calculation section signal;

calculating the difference between the mean power level of the first input signal and a first reference mean power level, for the field sync signal section, in a preset 8-level input signal state, to thereby produce a first mean power difference;

calculating the difference between the mean power level of the second input signal and a second reference mean power level, for the field sync signal section, in a preset 15-level input signal state, to thereby produce a second mean power difference;

comparing the first mean power difference and the second mean power difference for a predetermined period and outputting a selection determination signal based upon the comparison; and selecting said first or the second input signal in response to said selection determination signal and outputting the selected input signal to an equalizer.

10. A method for controlling driving selection of an NTSC rejection filter comprising the steps of:

rejection-filtering an NTSC signal component of a first input signal including an NTSC signal component and a multipath component and outputting the filtered signal as a second input signal;

calculating the mean power levels of the first and the second input signals of an arbitrary field section in response to a predetermined calculation section signal;

calculating the difference between a mean power level of the first input signal and a first reference mean power level of the arbitrary field section in a preset 8-level input signal state, as a first mean power difference, and calculating the difference between a mean power level of the second input signal and a second reference mean power level of the arbitrary field section in a preset 15-level input signal state, as a second mean power difference;

comparing the first and second mean power differences for a predetermined period and outputting a selection determination signal; and selecting said first or second input signal in response to said selection determination signal and outputting the selected input signal to an equalizer.

\* \* \* \* \*